United States Patent [19]

Shimp

[11] Patent Number: 4,902,752

[45] Date of Patent: Feb. 20, 1990

[54] POLYCYANATE ESTERS OF POLYHYDRIC PHENOLS BLENDED WITH THERMOPLASTIC POLYMERS

[75] Inventor: David A. Shimp, Prospect, Ky.

[73] Assignee: Hi-Tek Polymers, Inc., Jeffersontown, Ky.

[21] Appl. No.: 104,686

[22] Filed: Oct. 5, 1987

[51] Int. Cl.[4] ............................................. C08L 71/04
[52] U.S. Cl. .................................. 525/390; 525/420; 525/437; 525/523; 525/534; 525/535
[58] Field of Search ............... 525/390, 535, 906, 420, 525/437, 523, 534

[56] References Cited

U.S. PATENT DOCUMENTS

| | | | |
|---|---|---|---|
| 3,649,714 | 3/1972 | Wangsness | 525/123 |
| 4,414,366 | 11/1983 | Wu et al. | 525/439 |
| 4,631,319 | 12/1986 | Blahak et al. | 525/437 |

FOREIGN PATENT DOCUMENTS 0141349  11/1981  Japan .

Primary Examiner—Theodore E. Pertilla
Attorney, Agent, or Firm—Herbert P. Price

[57] ABSTRACT

Curable compositions are made from blends of polycyanate esters of polyhydric phenols and amorphous, aromatic thermoplastic resins which are initially soluble in the polycyanate ester but which phase separate during curing of the polycyanate ester.

8 Claims, 4 Drawing Sheets

FIGURE 1A— FRACTURE SURFACE MORPHOLOGY
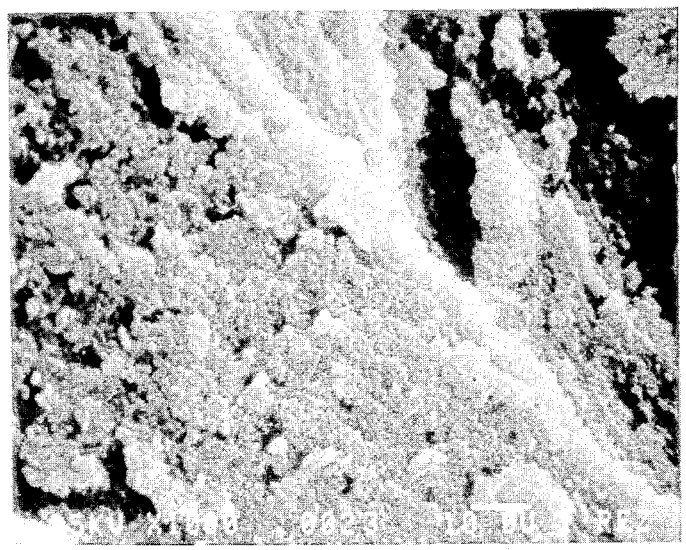
1,000X, Unetched
FIGURE 1B
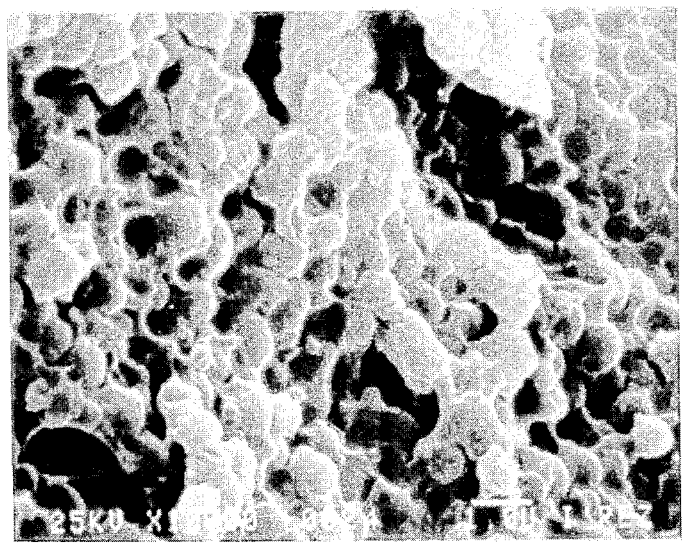
10,000X, Unetched FIGURE 2A—FRACTURE SURFACE MORPHOLOGY
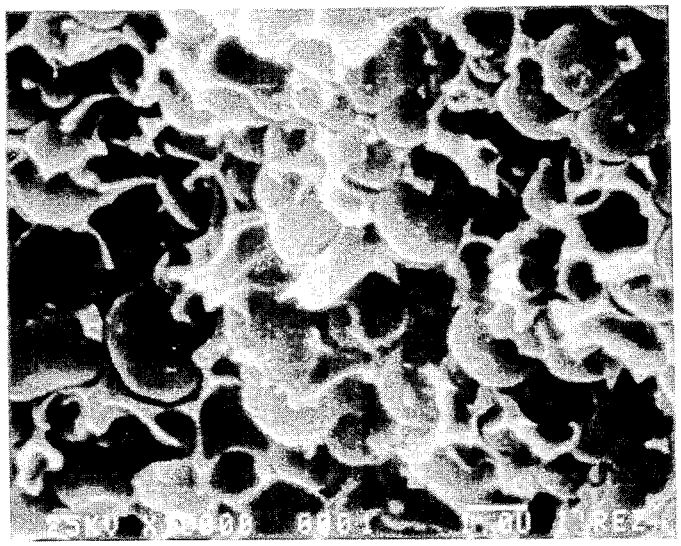
Ex. 2a, Unetched
FIGURE 2B
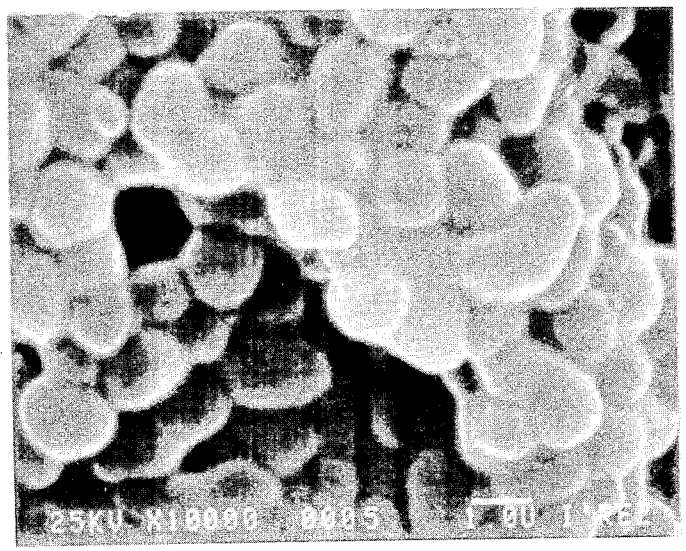
Ex. 2a, Solvent Etched FIGURE 2C-FRACTURE SURFACE MORPHOLOGY
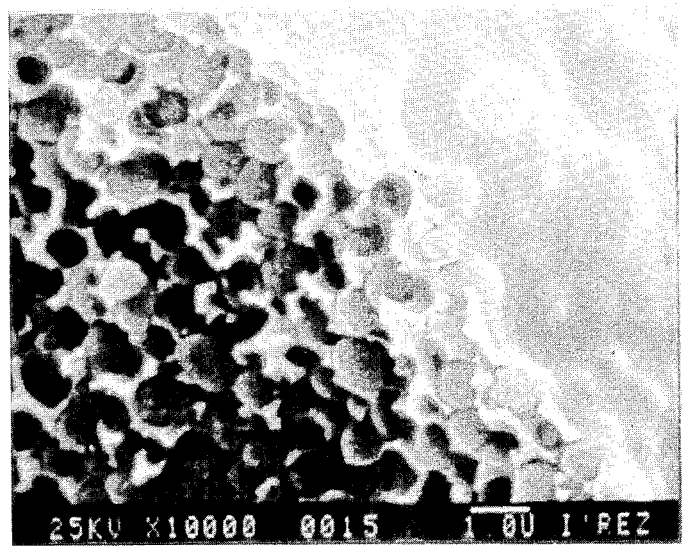
Ex. 2b, Unetched
FIGURE 2D
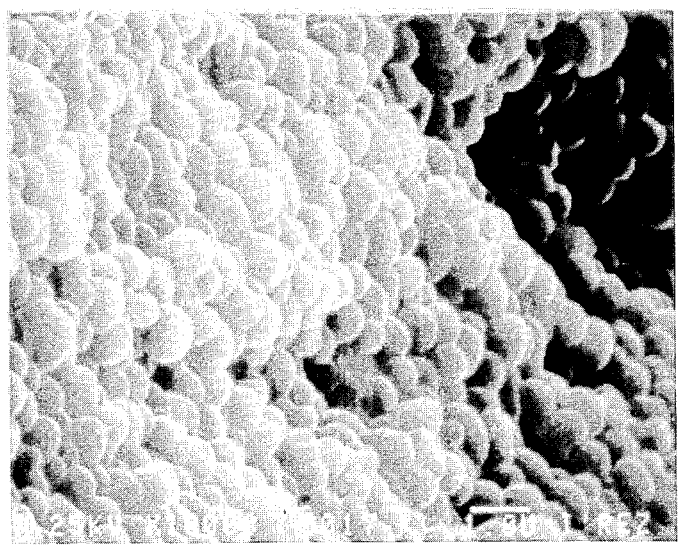
Ex. 2b, Solvent Etched FIGURE 3A–FRACTURE SURFACE MORPHOLOGY
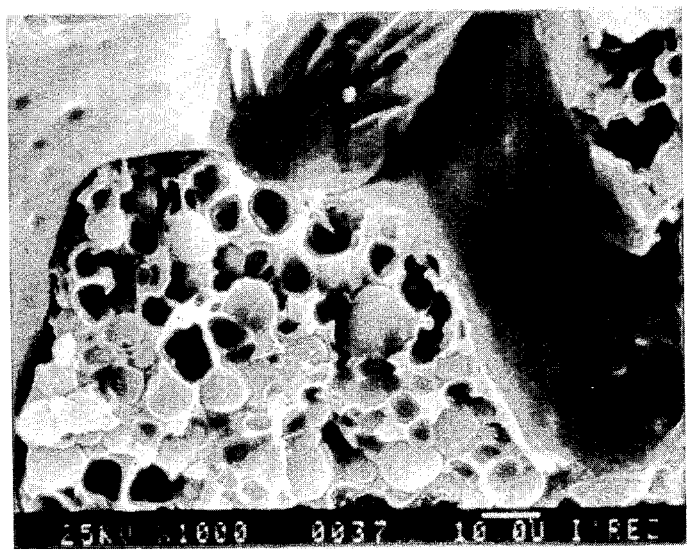
Unetched
FIGURE 3B
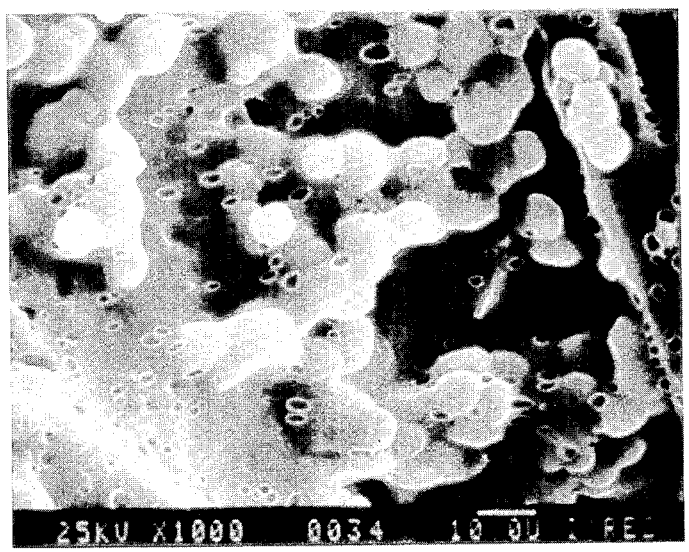
Solvent Etched

POLYCYANATE ESTERS OF POLYHYDRIC PHENOLS BLENDED WITH THERMOPLASTIC POLYMERS

BACKGROUND OF THE INVENTION

The field of art to which this invention pertains is polycyanate esters of polyhydric phenols.

Polycyanate esters of polyhydric phenols, as described in U.S. Pat. No. 3,553,244, are made by reacting cyanogen halide with polyhydric phenols. These esters will form thermoset compositions by cyclotrimerization of the cyanate groups to polycyanurate networks. Such thermoset compositions are finding numerous uses in a wide variety of industrial applications. However, there is a continuing effort to widen the uses for these compositions and to improve their properties, such as toughness.

The use of synthetic rubbers to toughen thermosetting resins is a well developed procedure. Functional oligomeric elastomers when blended with thermosettable resins will phase separate during the curing reaction and will be covalently bonded at the interface of the phases. The low modulus of the elastomer rich domains reduces the stiffness of structural composite matrices below levels required for performance at 180° F. or above, particularly when tested in the moisture saturated condition. Dimensional stability, especially critical for multilayer laminates used as electrical circuitry for computers, is also unsatisfactory when rubber modification exceeds 5 to 10 percent.

In U.S. Pat. No. 4,157,360 and No. 4,334,045, polycyanate esters are modified by blending with high levels of polyestercarbonates. Such blends are hard and non-conforming in the uncured state and require high temperatures for gelation due to the difficulty of incorporating active curing catalysts in the blends. Structural composites and film adhesives do not possess the tack and drape required for conventional lay-up on mold or part surfaces. The cured blends rarely develop phase-separated morphologies.

In U.S. Pat. No. 4,094,852, blends of polycyanate esters and high boiling plasticizers are described. Among the plasticizers disclosed are carbonic acid esters and carboxylic acid esters having molecular weights up to 10,000. When cured, phase-separated morphologies do not develop.

Blends of polycyanate esters and acrylonitrile-butadiene copolymers are disclosed in U.S. Pat. No. 3,649,714. In these blends, both the polycyanate ester and the acrylonitrile-butadiene copolymer cure when heated.

British Pat. No. 1,055,524 states that polycyanate esters can be modified with a number of polymers possessing a Tg of less than 100° C., such as homo and copolymers of vinyl chloride, polyvinylidene chloride, polystyrene, styrene-acrylonitrile copolymers, butadiene-acrylonitrile copolymers, natural and synthetic rubber, ethylene-vinyl acetate copolymers and the like. When hardened, the polycyanate products of the invention give rise to highly cross-linked, glass-clear synthetic resins with hard surfaces. The development of phase-separated morphologies is not taught by the patent.

In U.S. Pat. No. 4,631,319, polycyanate ester resins are modified with hydroxyl terminated aliphatic and cycloaliphatic polyester resins. Such modification with non-aromatic polyesters results in compositions which do not retain the stiffness under hot-wet conditioning necessary to meet matrix requirements for aircraft structural composites. Such compositions are also susceptible to destructive hydrolysis under conditions of prolonged moisture conditioning, such as 14 days immersion in 160° F. water or 48 hours in boiling water.

Polyepoxide resins have been modified with thermoplastic polymers as described in U.S. Pat. No. 4,661,559 and 4,567,216. Polysulfones, polyarylethers, phenoxy resins and the like are incorporated with the epoxy resin and diamine curing agent. Epoxy resins even when so modified do not possess the 250° C. Tg characteristics of polycyanurates nor their low moisture absorption. Epoxy resins are unsatisfactory for some higher temperature, moisture sensitive applications, such as composites and adhesives for supersonic aircraft.

Stiff, tough thermoset composites based on epoxy resins are described in U.S. Pat. No. 4,656,207 and No. 4,656,208. Oligomeric amine terminated aromatic resins in the amount of at least 35 weight percent are blended with epoxy resins. When cured, the aromatic resins form a discontinuous glassy phase. In addition to the aforementioned limitations of epoxy resin matrices, these composites lack tack, drape and out-life characteristics sought in structural composites and adhesives due to the high concentration of aromatic resins.

SUMMARY OF THE INVENTION

This invention pertains to thermoset polycyanate ester resins. Particularly, this invention relates to thermoset polycyanate ester resins toughened by being blended with amorphous aromatic thermoplastic resins.

The thermosetting compositions of this invention are comprised of a blend of (A) a polycyanate ester of a polyhydric phenol and (B) about 5 to about 25 weight percent, based on the weight of A and B, of an amorphous, aromatic thermoplastic resin which is initially soluble in the blend but which phase separates during cyclotrimerization of the polycyanate ester. The compositions when cured have fracture toughness properties defined as strain energy release rate in the crack opening mode exceeding 1.5 inch-lbs/inch$^2$.

BRIEF DESCRIPTION OF THE DRAWINGS

The invention is further illustrated in the figures which are photomicrographs of fractured surfaces of cured matrices.

FIGS. 1A and 1B shows the unetched morphology at 1000 and 10,000× magnification of the matrix of Example 1.

FIGS. 2A, 2B, 2C and 2D, and FIGS. 3A and 3B show the morphology before and after etching with methylene chloride of the matrices of Examples 2 and 5.

DESCRIPTION OF THE INVENTION

The polycyanate esters of polyhydric phenols useful in this invention are described in U.S. Pat. No. 3,553,244, which is hereby incorporated by reference. These polycyanate esters, which contain more than one cyanate ester group per molecule, are prepared by reacting cyanogen halide with a polyhydric phenol. Examples of cyanogen halides are cyanogen bromide, cyanogen chloride and cyanogen iodide with cyanogen chloride being preferred.

Polyhydric phenols from which the polycyanate esters are derived include resorcinol, p,p'-dihydroxydiphenyl, o,p'-dihydroxydiphenyl methane, p,p'-dihydroxydiphenyl propane (Bisphenol A as it is commonly called), p,p'-dihydroxydiphenyl sulfone, p,p'-dihydroxydiphenyl sulfide, p,p'-dihydroxydiphenyl oxide, 4,4'-methylenebis (2,6-dimethylphenol), 4,4'-(hexafluoroisopropylidene) diphenol, p,p',p"-trihydroxytriphenyl phosphate, dihydroxynaphthalene and novolac resins which contain more than 2 phenol moieties per molecule. Preferred polycyanate esters are those derived from bisphenols wherein the bridging member between the two phenyl groups is unsymmetrical. Examples of such bisphenols are bis(4-hydroxyphenyl)-1,1-ethane, bis(4-hydroxyphenyl-2,2-butane) and bisphenols wherein one substituent on the bridging member is an aromatic moiety.

Blends of polycyanate esters of ay of the polyhydric phenols can also be used. Particularly preferred blends are those made from crystalline polycyanate esters, e.g., those derived from Bisphenol A, and liquid, amorphous polycyanate esters, e.g., those derived from bis(4-hydroxyphenyl)-1,1-ethane.

Thermoplastic resins useful in this invention are amorphous, aromatic thermoplastic resins having heat deflection temperatures of at least 150° C. and which are initially soluble in the polycyanate ester but which phase separate during cyclotrimerization of the polycyanate ester. Such thermoplastic resins include polysulfones, polyethersulfones, polyimides, polyetherimides, polyarylates, polyarylformals and polyarylethers.

Polysulfones and polyethersulfones are described in the Third Edition of "Encyclopedia of Chemical Technology" by Kirk-Othmer, Volume 18, pages 605-610 (1978) which is hereby incorporated by reference. Such polymers are chemically polyethersulfones in that they have both aryl ether and aryl sulfone linkages in the polymer backbone.

Polyimides are described in U.S. Pat. No. 3,856,752 which is hereby incorporated by reference. Such polyimides are made by reacting an asymmetric diamine, e.g., phenylindane diamine, with a dianhydride.

Polyetherimides are described in "Modern Plastics Encyclopedia", 1983-1984, Volume 60, Number 10A, pages 54-55 and in U.S. Pat. No. 4,431,779 which are hereby incorporated by reference. Polyetherimides can be made by reacting an aromatic bis(ether anhydride) with a diamine.

The polyarylates useful in this invention are wholly aromatic amorphous polyesters made by reacting aromatic dicarboxylic acids, e.g., blends of isophthalic acid and terephthalic acid, with dihydric phenols, e.g., Bisphenol A. Polyacrylates are described in "Modern Plastics Encyclopedia" ibid, pages 42-44 and in U.S. Pat. No. 4,415,721 and No. 4,426,511 which are hereby incorporated by reference.

Polyarylformals are prepared by the Williamson ether synthesis of reacting dihaloalkanes, e.g., methylene bromide with diphenols or bisphenols. Polyarylformals are described in the Journal of Polymer Science: Polymer Letters Edition, Vol. 21, pages 449-457 (1983) which is hereby incorporated by reference.

Polyarylethers, e.g., polyphenylene ethers or polyphenylene oxide, are described in U.S. Pat. No. 4,431,779 which is hereby incorporated by reference.

Preferred thermoplastic polymers are those which are terminated with graftable sites, such as hydroxyl groups, amine groups, or epoxy groups, and which have molecular weights ($M_n$) in the range of about 10,000 to about 30,000.

The compositions of this invention can be prepared by adding the thermoplastic polymer in finely divided form to the molten polycyanate ester heated at about 100° to about 200° C. under an inert gas blanket. Heating and stirring are continued until the thermoplastic polymer is completely dissolved. A sample of the blend is cooled to room temperature (cold pill) to determine whether or not the blend will crystallize when cooled. In order to reduce or eliminate crystallization, heating of the blend is continued at about 140° C. to about 190° C. until the cold pill test show no crystallization. The polycyanate ester when heated as described partially cyclotrimerizes to form a prepolymer. Conversion of about 5 percent to about 30 percent of the original cyanate functionality to the triazine structure will generally suppress or eliminate crystallization of the blend while preserving a viscous liquid or semisolid physical state. The non-crystalline, i.e., viscous liquid or semisolid, physical state contributes tack and drape to reinforced prepregs and filmed adhesives. The preferred degree of conversion is about 10 to about 20 percent. It is important that the melt viscosity of the blend does not exceed 10,000 cps when measured at 250° F. In preparing reinforced prepregs, filming of the blends and the subsequent wetting of fibrous reinforcements proceeds best at melt viscosities below 10,000 cps.

The compositions of this invention can also be prepared by dissolving the thermoplastic polymer in an appropriate solvent along with the polycyanate ester. The solvent is then removed by vacuum distillation. A continuous film evaporator is particularly advantageous for use in recovering neat, hot-melt processable blends with minimal cyclotrimerized advancement during solvent stripping.

Solutions of the blends in organic solvents are generally used for the impregnation of woven reinforcements. Solvents such as methylene chloride, dichloroethylene, chloroform, chlorobenzene, cyclopentanone and dimethyl formamide will usually dissolve the thermoplastic polymer as well as the polycyanate ester. Nonhalogenated solvents of medium to high volatility are preferred for combustion at the stack and for minimal residual volatiles in the prepregs. For these reasons, cyclopentanone is particularly useful.

Cure catalysts are incorporated to accelerate gelation when curing temperatures below 350° F. are used. Typically such temperatures are about 200° F. to about 300° F. Phase separation of the blends occurs efficiently at these temperatures. In order to obtain satisfactory mechanical and thermal properties, it is usually necessary to convert at least about 85 percent of the cyanate groups to triazine structures. Cure catalysts are particularly needed when production curing is limited to maximum temperatures in the 350° F. to 450° F. range which temperatures are below the ultimate Tg of the polycyanurate homopolymer.

Any catalyst which will accelerate the cure of polycyanate esters can be used in this invention. Such catalysts, which are of the active hydrogen and metal coordination classes, are described in U.S. Pat. Nos. 3,962,184; 4,026,913; 4,110,367; 4,195,132; 4,429,112; 4,330,658; 4,330,669 and 3,694,410 which are hereby incorporated by reference. Active hydrogen class catalysts are alcohols, phenols, carboxylic acids and primary and secondary amines. These catalysts are generally used in the amounts of about 5 to about 100 meq. of active hydrogen per cyanate equivalent. The metal coordination class catalysts are coordination metal carboxylates and chelates. These catalysts are used in the amounts of about 5 to about 500 ppm metal based on the weight of total resin solids. Preferred catalysts are liquid blends of coordination metal carboxylates and chelates dissolved in a non-volatile, hydroxyl functional liquid. Such catalysts are described in U.S. Pat. Nos. 4,604,452 and 4,608,434 which are hereby incorporated by reference. Particularly preferred catalysts are blends of transition metal acetylacetonates in alkylated phenols which are described in copending patent application, Ser. No. 78,037, filed July 27, 1987, which is hereby incorporated by reference.

As stated hereinbefore, the compositions of this invention are thermosetting blends of polycyanate esters of polyhydric phenols toughened with about 5 to about 25 weight percent of amorphous aromatic thermoplastic polymers having heat deflection temperatures above about 150° C., wherein the weight percent is based on the weight of the polycyanate ester and the thermoplastic polymer. The thermoplastic polymer must be initially soluble in the blend but must phase separate during gelation (cyclotrimerization) of the polycyanate ester in order to develop complex morphologies. In order to obtain phase separation, the blends are gelled at temperatures in the range of about 200° F. to about 350° F. To achieve gelation in a practical time period, it is preferred that catalysts of the active hydrogen and metal coordination classes be incorporated. After gelation is accomplished, the compositions are cured at a temperature of about 350° to about 500° F. for about 30 minutes to about 8 hours. Maximum toughening is obtained from three dimensional co-continuous networks of thermoset-rich and thermoplastic rich agglomerates in which nodular cross-sections are equal to or less than 5 micrometers.

The compositions of this invention can be modified with epoxy resins and bismaleimides. Up to about 50 weight percent of the polycyanate ester can be replaced with the epoxy resin and up to about 20 weight percent of the polycyanate ester can be replaced with bismaleimides. Useful epoxy resins are the glycidyl ethers of polyhydric phenols which are made by reacting an epihalohydrin, preferably epichlorohydrin, with a polyhydric phenol. Such polyhydric phenols are described hereinbefore in the description of polycyanate esters. Preferred polyepoxide resins are those derived from Bisphenol A having epoxide equivalent weights of about 180 to about 300.

Bismaleimides are the reaction products of maleic anhydride and a diamine and are described in U.S. Pat. No. 4,110,364 which is hereby incorporated by reference.

When formulating for particular end uses, additional components can be incorporated in the compositions of this invention. Such components include reinforcing fibers, colloidal silica flow modifiers, mineral fillers and pigments.

The cured compositions of this invention have the following properties:

(a) Strain energy release rate in the crack opening mode ($G_{IC}$) $\geq 1.5$ in-lbs/in$^2$, preferably 3 to 6 in-lbs/in$^2$;

(b) Strain-at-break in flexure (ASTM D 790) $\geq 5$ percent, preferably $\geq 7$ percent;

(c) Heat deflection temperature (HDT): tested dry $\geq 170°$ C.; tested wet (conditioned 64 hours @ 92° C. and $>95$ percent relative humidity— $\geq 150°$ C.;

(d) Elastic modulus
  $\geq 0.40 \times 10^6$ psi at RT (dry);
  $\geq 0.25 \times 10^6$ psi at 180° F. wet, (after boiling in water for 48 hours);

(e) Water absorption when conditioned 64 hours at 92° C. and $\geq 95$ percent R.H., or 48 hours in boiling water of $<2$ percent.

Thermoset compositions having these properties are suitable for damage tolerant aircraft structural composites and adhesive bonded assemblies.

The following examples describe the invention in more detail. Parts and percentage, unless expressed otherwise are parts and percentages by weight.

EXAMPLE 1

To a suitable reactor heated by an oil bath were added 1840 parts of crystalline Bisphenol A dicyanate. The temperature was raised to 120° C. to melt the dicyanate while applying a nitrogen sparge. When the dicyanate was melted, 460 parts of polysulfone powder (Udel 1800—Union Carbide Corporation) were added. The temperature was raised to 144° C. over a 25 minute period to dissolve the polysulfone. The temperature was then raised to 191° C. over one hour and 28 minutes. Heating under nitrogen sparge was continued at 190°–200° C. for 2 hours and 17 minutes at which time the cold pill test showed no crystallization. The refractive index of the blend changed from 1.5529 to 1.5644 (measured at 110° C.) during the heating period. Fifteen percent of the original cyanate functionality cyclotrimerized as calculated from the refractive index increase. The viscosity of the blend was 85,000 cps at 185° F., 29,400 cps at 215° F. and 12,700 at 245° F.

Two hundred parts of the blend were heated to 200° F. and 5.44 parts of a catalyst made by dissolving 4.08 parts of copper acetylacetonate into 540 parts of nonyl phenol were added. When solution was obtained and after vacuum deairing, the catalyzed blend was poured into an aluminum sheet mold preheated to 220° F. The blend was heated at 275° F. until it gelled—90 minutes— —and was then heated for one hour at 350° F. and 2 hours at 410° F. The resulting cured composition had a fracture toughness ($G_{IC}$) of 4.2 in-lbs/in$^2$ and 7.5 percent flexure strain at break. The heat deflection temperature was 192° C. when tested in the dry condition and 170° C. after moisture conditioning 64 hours at 92° C. in relative humidity of greater than 95 percent.

The fracture toughness ($G_{IC}$), which is the strain energy release rate in the crack opening mode, was determined by the double torsion method. A plaque, $10'' \times 2'' \times \frac{1}{4}''$, was bottom-grooved in the length direction with a very sharp notcher. The notched plaque was tested by being supported at the corners on ball bearings and top loaded in an Instron testing machine until a crack was initiated. Loading was continued in stepwise manner, thereby developing a series of cracks. The work required to propogate each crack segment was divided by crack area. The initial crack propagation was ignored and the subsequent crack propagation energies were calculated and averaged.

Fractured cross sections, examined by the scanning electron microscope before and after solvent extraction of the thermoplastic agglomerates with methylene chloride, revealed a co-continuous 3-dimensional morphology consisting of (1) a major solvent-insoluble (polycyanurate rich) phase characterized by fused nodules of 0.3 to 1 micron cross-section and a minor solvent soluble (thermoplastic rich) phase which was without form and fills between the nodular thermoset phase. FIGS. 1A and 1B shows the unetched morphology of a fracture surface at 1000 and 10,000× magnification respectively.

Scanning loss modulus (E'') versus temperature by Dynamic Mechanical analysis revealed two energy absorbing maxima corresponding to the Tg of the thermoplastic rich phase and the polycyanate thermoset phase. The energy absorption of the thermoplastic response was greater than that of the thermoset response.

EXAMPLE 2

To a suitable reactor were added 144 parts of a liquid dicyanate (the dicyanate ester of bis(4-hydroxyphenyl)-1,1-ethane and 36 parts of polysulfone powder. The mixture was heated to 125°-145° C. until the polysulfone dissolved. The temperature was lowered to 100°-120° C. and 4.9 parts of the catalyst solution described in Example 1 were added. After vacuum deairing, the catalyzed blend was poured into an aluminum sheet mold preheated to 250° F. The blend was gelled in 120 minutes at 250° F. and was then cured for one hour at 350° F. and 2 hours at 410° F. (Casting A).

Using the same procedure and components, a cured casting (Casting B) was made from 135 parts of the dicyanate ester, 45 parts of polysulfone and 4.9 parts of catalyst solution.

The cured castings exhibited similar 2-phase networks which were 3 dimensional and co-continuous. The polycyanurate (thermoset rich) phase consisted of fused nodes which were filled in the boundary areas with thermoplastic (solvent soluble) agglomerates sometimes appearing as membranes resembling egg crates.

FIGS. 2A, 2B, 2C and 2D show the morphologies of both compositions before and after etching of the fracture surfaces with methylene chloride.

The physical properties of the blended resins and the cured castings are as follows:

| Example Viscosity before cure,cps | 2A | 2B |
| --- | --- | --- |
| 185° F. | 12,800 | 47,000 |
| 215° F. | 5,840 | 21,000 |
| 245° F. | 2,100 | 10,600 |
| HDT °C. | | |
| Dry | 174 | 177 |
| Wet | 157 | 158 |
| % H2O Abs | 1.27 | 1.47 |
| Flexure St. (psi) | 21,800 | 22,400 |
| Flexure Strain (%) | 5.8 | 8.2 |
| Flexure Modulus (10$^6$ psi) | 0.44 | 0.43 |
| G$_{IC}$, in-lbs/in$^2$ | 1.53 | 3.21 |

EXAMPLE 3

To a suitable reactor were added 27 parts of polyetherimide (Ultem 1000—General Electric Co.), 9 parts of polyester resin (Vitel PE 222—Goodyear Chemicals) and 150 parts of methylene chloride. When the thermoplastic polymer dissolved, 144 parts of 4,4'-dicyanatodiphenyl ether were added. After solution was obtained, the methylene chloride was removed by vacuum distillation to a temperature of 120° C. The clear blend was cooled to 110° C., and catalyst (solution of 0.07 part of copper acetylacetonate in 6.5 parts of nonyl phenol) was added. After vacuum deairing, the catalyzed blend was poured into a mold preheated to 121° C. The blend gelled after 30 minutes at 250° F. and was cured by heating 2 hours at 350° F. and 2 hours at 410° F. (Casting A).

Another casting was prepared from 36 parts of polyetherimide, 144 parts of 4,4'-dicyanatodiphenyl ether and a catalyst solution of 0.07 part of copper acetylacetonate in 6.5 parts of nonyl phenol using the same procedure described above. (Casting B).

The properties of these castings are as follows:

| Casting | 3A | 3B |
| --- | --- | --- |
| HDT °C. | | |
| Dry | 202 | 197 |
| Wet | 161 | 159 |
| % H2O Absorption | 1.51 | 1.81 |
| Flexure Strength, psi | 24,117 | 24,920 |
| Flexure Modulus (10$^6$ psi) | 0.46 | 0.46 |
| Flexure Strain at break, % | 9.8 | 7.9 |
| G$_{IC}$ (in lbs/in$^2$) | 6.1 | 3.9 |
| 180° F. Wet | | |
| Flexure Strength, psi | 12,994 | 14,680 |
| Flexure Modulus (10$^6$ psi) | 0.35 | 0.4 |
| Flexure Strain, % | >12 | >12 |

EXAMPLE 4

Using the same procedure described in Example 3, a casting was prepared from a blend of 160 parts of 4,4'-dicyanatodiphenyl ether, 21.8 parts of polyetherimide and a catalyst solution of 0.07 part of copper acetylacetonate in 6.5 pars of nonyl phenol. The casting was gelled in 40 minutes at 250° F. and was cured for 3 hours at 350° F. and 1 hour at 450° F. (Casting A.)

Another casting was prepared as described above from 160 parts of 4,4'-dicyanatodiphenyl ether, 21.8 parts of polyarylate (Durel 400—Celanese Engineering Resins, Inc.) and a catalyst solution of 0.07 part copper acetylacetonate in 6.5 parts of nonyl phenol. (Casting B)

A casting was also prepared from 160 parts of the dicyanate and a catalyst solution of 0.24 part zinc nathphenate and 2.7 parts of nonyl phenol, gelled at 220° F. in 30 minutes and cured 350° F. for 1 hour, 420° F. for 1 hour and 482° F. for 2 hours. (Casting C).

| Casting | 4A | 4B | 4C |
| --- | --- | --- | --- |
| HDT °C. | | | |
| Dry | 216 | 215 | 234 |
| Wet | 160 | 154 | 182 |
| % H2O Absorption | 1.44 | 1.58 | 1.82 |
| Tensile Strength, psi | 15,416 | 13,738 | 14,870 |
| Tensile Strain-at-break, % | 6.9 | 5.1 | 5.1 |
| Tensile Modulus (10$^6$, psi) | 0.40 | 0.39 | 0.42 |
| Flexure Strength, psi | 22,556 | 21,559 | 24,010 |
| Flexure Strain-at-break, % | 8.00 | 7.82 | 8.57 |
| Flexure Modulus (10$^6$,psi) | 0.43 | 0.40 | 0.42 |
| G$_{IC}$ (in-lbs/in$^2$) | 2.39 | 2.65 | 1.24 |

EXAMPLE 5

Thirty parts of polyetherimide (Ultem 1000) were dissolved by heating and stirring in 150 parts of methylene chloride. Eighty parts of the dicyanate ester of Bisphenol A and 80 parts of the dicyanate ester of 4,4'-methylenebis(2,6-dimethylphenol) were dissolved in the methylene chloride. The solvent was then removed by vacuum distillation to a temperature of 122° C. Ten parts of a liquid epoxy resin (the diglycidyl ether of Bisphenol A having an epoxide equivalent weight of 185) were added followed by a catalyst solution of 0.042 part of copper acetylacetonate in 5.4 parts of nonyl phenol. After vacuum deairing, the molten blend was poured into a metal mold preheated to 275° F. After gelation (45 minutes at 275° F.), the casting was cured 1 hour at 350° F. and 2 hours at 410° F. Fractured cross sections examined by scanning electron microscope showed a 2-phase, co-continuous network of fused nodular thermoset material of 5 to 10 micron node cross-section. The nodes contained isolated spherical deposits of the thermoplastic which are typically less than 2 microns in diameter. The solvent soluble thermoplastic membrane had an "egg carton" configuration which filled the thermoset nodes at phase boundaries. FIGS. 3A and 3B compare the morphology of a fracture surface before and after solvent etching.

The physical properties of the casting are as follows:

| HDT °C. | |
| --- | --- |
| Dry | 201 |
| Wet | 181 |
| % H$_2$O Absorption | 1.3% |
| G$_{1C}$, in-lbs/in$^2$ | 4.5 |
| Flexural Modulus | |
| Dry at 77° F. | 0.46 × 10$^6$ psi |
| Wet at 180° F. | 0.36 × 10$^6$ psi |
| % Weight Change after 2 weeks in methylethyl ketone | |
| at 77° F. | −0.15% |
| in Skydrol at 160° F. after 2 weeks | +0.25% |

EXAMPLE 6

Using the procedure described in Example 1, 196 parts of the dicyanate ester of Bisphenol A and 42 parts of a phenolic terminated polyether sulfone (Victrex 5003A, —Imperial Chemical Industries, Ltd.) were heated at 145°–185° C. to dissolve the thermoplastic polymer in the dicyanate ester. Forty-two parts of the diglycidyl ether of Bisphenol A having an epoxide equivalent weight of 185 were added and heating at 140°–180° C. was continued to cyclotrimerize a portion of the cyanate groups to prevent crystallization when cooled. During this heating period, the refractive index measured at 100° C. increased from 1.5522 to 1.5612 indicating 11 percent cyclotrimerization of the cyanate functionality. The melt viscosity of the amorphous semisolid composition was:

| Temperature | Viscosity |
| --- | --- |
| 185° F. | 12,800 cps |
| 215° F. | 4,580 cps |
| 245° F. | 2,040 cps |

A catalyst solution of 0.029 part of copper acetylacetonate in 7.56 parts of nonyl phenol was added to the composition at 118° C. The composition was vacuum deaired and was poured into a mold preheated to 275° F. The composition gelled within 65 minutes at 275° F. It was then cured by heating for 3 hours at 350° F. and 3 hours at 410° F. Physical properties of the cured casting were:

| Properties | Dry at R.T | Wet at 180° F. |
| --- | --- | --- |
| Flexure Strength, psi | 25,500 | 13,900 |
| Flexure Modulus, 10$^6$ psi | 0.44 | 0.38 |
| Flexure Strain-at-break, % | 7.7 | >10 |
| G$_{IC}$ in-lbs/in$^2$ | 1.52 | |

EXAMPLE 7

Using the procedure described in Example 1, a blend was prepared from 45 parts of hydroxyl terminated polysulfone powder (Udel P1800) and 205 parts of the dicyanate ester of Bisphenol A. The blend was catalyzed with a solution of 0.051 part of copper acetylacetonate in 6.75 parts of nonylphenol, was gelled by heating at 275° F. for 65 minutes, and was cured at 350° F. for 1 hour and 410° F. for 2 hours. The cured composition exhibited a strain-at-break of 9.2 percent and when tested wet at 200° F. after 48 hours in boiling water, exhibited flexure strength of 11012 psi, flexure modulus of 0.34×10$^6$ and flexure strain of greater than 12 percent.

A similar composition made from a polyethersulfone with less hydroxyl termination (Radel 200—Union Carbide Corporation) had a flexure strain-at-break of 2.28 percent. The 200° F. wet properties were flexure strength of 3719 psi, flexure modulus of 0.19×10$^6$ psi and flexure strain of 1.98 percent.

EXAMPLE 8

Using the same procedure described in Example 3, a blend was prepared by dissolving 112 parts of the dicyanate ester of Bisphenol A and 28 parts of polyarylate thermoplastic (Durel 400) in 90 parts of monochlorobenzene, followed by removal of the solvent under vacuum to 350° F. The blend (Blend A), after vacuum deairing was poured into a metal mold preheated to 350° F. and was heated overnight at 350° F. to gel the blend.

An identical blend was then prepared to which was added a catalyst solution of 0.07 part of zinc acetylacetonate dissolved in 1.33 parts of the diglycidyl ether of Bisphenol A having an epoxide equivalent weight of 185 plus 0.3 part imidazole. This catalyzed blend (Blend B) after vacuum deairing was poured into a mold preheated to 300° F. The blend gelled within 28 minutes at 300° F. Both castings were cured for 3 hours at 450° F. and 2 hours at 482° F. The physical properties of the blends are as follows:

| Blend | A | B |
| --- | --- | --- |
| HDT °C. | | |
| Dry | 232 | 225 |
| Wet | 174 | 171 |
| H$_2$O Absorption, % | 1.32 | 0.98 |
| Tensile Strength, psi | 7516 | 12,909 |
| Tensile Strain, % | 2.0 | 4.6 |
| Tensile Modulus (10$^6$ psi) | 0.4 | 0.4 |
| Flexure Strength, psi | 18,578 | 23,366 |
| Flexure Strain, % | 5.25 | 8.88 |
| Flexure Modulus (10$^6$ psi) | 0.4 | 0.4 |

The mechanical properties of the B blend (catalyzed and gelled rapidly at a lower temperature) are improved by 50 percent to 250 percent over those of the uncatalyzed Blend A casting. Dynamic Mechanical Analysis scans of tensile loss modulus (E″) versus temperature reveals a major energy absorbing peak near the Tg of the polyarylate thermoplastic in the B matrix (206° C.) as well as a peak at 288° C. which is near the Tg of the thermoset resin. The A matrix shows only one peak at 268° C. Molecular solutions provide only one (averaged) damping response while phase separated agglomerates produce individual damping responses near the Tg temperatures of each component. The conditions which promoted phase separation, i.e., catalysis and lower temperature gelation, increased matrix toughness.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. A cured composition comprised of a blend of:
   (A) a polycyanate ester of a polyhydric phenol;
   (B) an amorphous, aromatic thermoplastic resin which is initially soluble in the blend but which phase separates during cyclotrimerization of the polycyanate ester; and
   (C) a polycyanate curing catalyst,
   wherein B is present in the amount of about 5 to about 25 weight percent based on the weight of A and B, said cured composition having strain energy release rate values in the crack opening mode, $G_{IC}$, in excess of 1.5 inch-pounds/inch$^2$.

2. The cured composition of claim 1 wherein the thermoplastic resin has a heat deflection temperature of at least 150° C.

3. The cured composition of claim 2 wherein the thermoplastic resin is selected from the group consisting of polysulfones, polyetherimides, wholly aromatic polyesters, polyether sulfones wholly imidized polymers of dianhydrides and asymmetric diamines, polyarylethers and polyarylformals.

4. The cured composition of claim 3 wherein the thermoplastic resins are terminated with hydroxyl groups, amine groups, or epoxy groups.

5. The cured composition of claim 1 wherein the polycyanate ester is a polycyanate ester of a dihydric phenol selected from the group consisting of 4,4'-dihydroxydiphenyl propane, 4,4'-dihydroxydiphenyl oxide, 4,4'-methylene bis(2,6-dimethylphenol) and bis(4-hydroxyphenyl)-1,1-ethane.

6. The cured composition of claim 1 wherein the catalyst is an active hydrogen class catalyst.

7. The cured composition of claim 1 wherein the catalyst is a metal coordination class catalyst.

8. The cured composition of claim 1 wherein the strain energy release values in the crack opening mode are about 3 to about 6 inch pounds/inch$^2$.

* * * * *